(12) United States Patent
Park et al.

(10) Patent No.: US 6,763,155 B2
(45) Date of Patent: Jul. 13, 2004

(54) MACH-ZEHNDER INTERFEROMTER (MZI) FILTER DEVICES

(75) Inventors: Jae Dong Park, Kanata (CA); Ken Hongkeun Cho, Etobicoke (CA); Hamid Hatami-Hanza, Ottawa (CA); Nima Ahmadvand, Ottawa (CA)

(73) Assignee: Peleton Photonic Systems Inc., Ottawa (CA)

( * ) Notice: Subject to any disclaimer, the term of this patent is extended or adjusted under 35 U.S.C. 154(b) by 87 days.

(21) Appl. No.: 09/809,795

(22) Filed: Mar. 16, 2001

(65) Prior Publication Data

US 2001/0026655 A1 Oct. 4, 2001

(30) Foreign Application Priority Data

Mar. 22, 2000 (CA) .............................................. 2301971

(51) Int. Cl.$^7$ .............................. G02B 6/12; G02B 6/28
(52) U.S. Cl. ............................................. 385/14; 385/24
(58) Field of Search .............................. 385/14, 43, 39, 385/45, 30, 42, 51, 15, 24, 27, 31–32

(56) References Cited

U.S. PATENT DOCUMENTS 6,031,948 A * 2/2000 Chen .......................... 385/24

* cited by examiner

Primary Examiner—Frank G Front
Assistant Examiner—Michael P. Mooney

(57) ABSTRACT

A method of making an asymmetric Mach-Zehnder Interferometer (MZI) adjusts the length of the arms of two Michelson Interferometers, (MI) to achieve desired wavelength response then combines the MIs to provide the MZI. An asymmetric MZI is, therefore, provided which comprises two asymmetric MIs optically connected back-to-back.

5 Claims, 4 Drawing Sheets

MACH-ZEHNDER INTERFEROMTER (MZI) FILTER DEVICES

BACKGROUND OF THE INVENTION

1. Field of the Invention

The present invention relates generally to optical filters and particularly to cascadable Mach-Zehnder Interferometers (MZI) in optical filters. More particularly still, it relates to methods of forming asymmetric MZIs by adjusting the two Michelson Interferometer (MI) components of an MZI prior to combining them into an asymmetric MZI.

2. Introduction

Optical filters are desirable in modern optical communication transmission systems and networks. These optical systems and networks use Wavelength Division Multiplexed (WDM) signals, in which each data channel sends its data using a light with a particular wavelength. WDM signalling increases the transmission capacity while providing more flexibility by the possibility of wavelength connectivity, routing, etc. Optical filters that can combine or separate different wavelength channels, known as WDM multiplexers or demultiplexers, therefore are important components of these systems. WDM filters can be fabricated by variety of methods such as using thin film dielectric filters or array waveguide gratings utilizing planar optical waveguides. WDM filters also can be made by interferometers and more specifically by number of interferometers cascaded in pre-arranged configurations. One class of these interferometers based optical filters are Cascaded Asymmetric Mach-Zehnder Interferometers (MZIs). Asymmetric MZIs show a periodic response as a function of wavelength the period of which is a function of length difference between the arms of the interferometer. The longer the length difference the shorter the wavelength response oscillations and therefore the higher wavelength selectivity. Asymmetric MZIs when connected to each other as interleavers can multiplex or demultiplex a large number of optical signals with different wavelengths such as the standard ITU grid wavelengths. An optical filter interleaver can separate the odd and even wavelengths from a WDM signal with a number of wavelengths.

The MZIs that are constructed by optical fibers are called all fiber MZIs. All fiber MZIs are desirable because of their excellent compatibility with the transmission media, i.e. optical fibers, low polarization dependency and low insertion loss compared to other WDM filters fabricated by other technologies. However, the challenge in all fiber Asymmetric MZIs is to control the length difference between the arms of an all fiber asymmetric MZI, since the wavelength response depends on this length difference. To make an all fiber MZI, two optical couplers that are used as splitter and combiner in the Interferometer are prefabricated. The optical couplers in an all fiber MZI configuration are usually fused tapered couplers. In fabricating fused tapered couplers two optical fibers are brought into close proximity and are heated to certain degree while pulling the two fibers so that the cores of the optical fibers come close enough to each other such that they can start to transfer energy by evanescent field coupling.

The processes of making fused tapered couplers are relatively sensitive and have low yield to achieve a desired coupling, i.e., splitting, ratio. However making two optical fused couplers in an asymmetric interferometer configuration with accurate length differences in one process is even more challenging, resulting in all fiber asymmetric MZIs being a low yield fabrication process.

It is therefore desirable to have an alternative and lower cost method of constructing all fiber asymmetric MZIs.

SUMMARY OF THE INVENTION

The present invention provides an all fiber asymmetric MZI by first making a coupler with two arms in the form of a Michelson Interferometer (MI) and then adjusting the length(s) of the arms(s) of the MI by precision grinding and/or polishing until the desired wavelength response is achieved. While performing this process step on the MI, a very accurate estimate of the length difference between the arms is obtained from the analytical relations between the length difference and the wavelength response. It is also possible to measure the length difference between the two arms of the Michelson interferometer by high precision reflectometers such as HP model No 8504B with a resolution of better than 20 microns. To achieve an even better resolution than with a reflectometer, it is possible to use optical spectrum analyzers to compute the length difference from the spectral shape of the Mchelson interferometer wavelength response. By the latter method it is possible to adjust the length difference to within one micron precision.

After making the MIs with the desired length difference, a Mach-Zehnder Interferometer is made my connecting two MIs back-to-back. The total length difference of the resultant asymmetric MZI, therefore, is either the sum of the length differences of the two individual MIs or the difference of the two. In this way a systematic method of constructing and fabricating all fiber asymmetric MZIs with the desired length differences, ie. wavelength responses, with very good precision.

BRIEF DESCRIPTION OF THE INVENTION

The preferred embodiments of the present invention will now be described in detail in conjunction with the annexed drawing figures, in which.

DETAILED DESCRIPTION OF THE PREFERRED EMBODIMENTS

Figure 1:
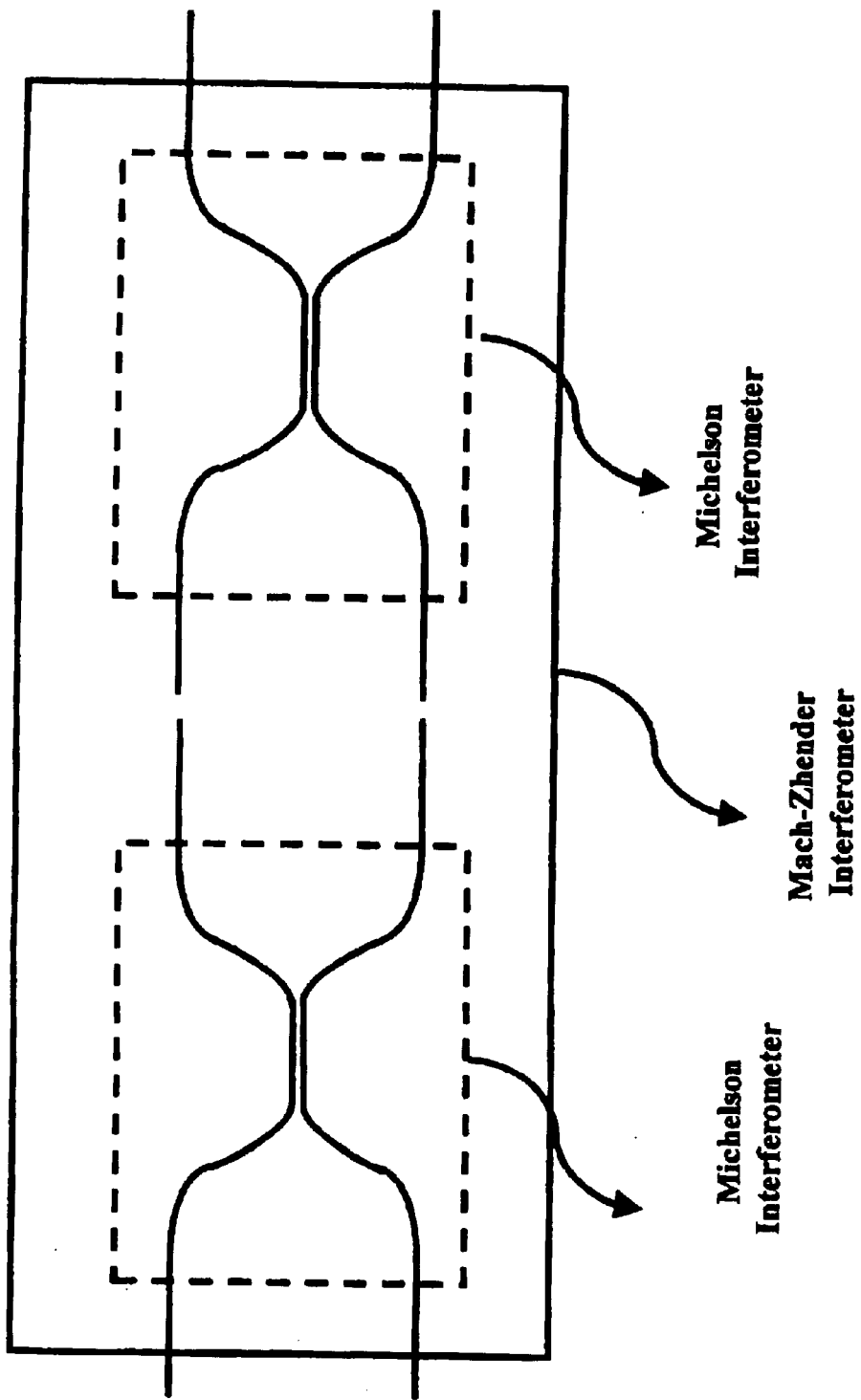
FIG. 1 shows an asymmetric MZI according to the present invention as a composite of the MIs.

Referring now to FIG. 1, an optical waveguide MZI comprises two optical splitter/coupler/MIs which are connected to each other by two lengths of optical waveguides known as arms/10 and 11. The arms 10 and 11 of the MZI have different lengths to provide an Asymmetric Mach-Zehnder Interferometer or AMZI. The optical waveguides here may be both optical fibers with circular cross sections and/or planar optical waveguides with non-circular cross sections. When the MZI is made from optical fibers it is termed an all fiber MZI.

Asymmetric interferometer apparatii have periodic responses as a function of wavelength and are often used as optical filters. It is also known that, in particular, cascaded asymmetric MZIs provide optical fibers with good filtering characteristics. However to get a satisfactory wavelength resolution, the length difference of an asymmetric MZI has to be adjusted within one micron precision. All fiber MZIs are attractive because of their low insertion losses and almost polarization independent performance. All fiber MZIs can be made by cascading two fused tapered couplers.

Figure 2:
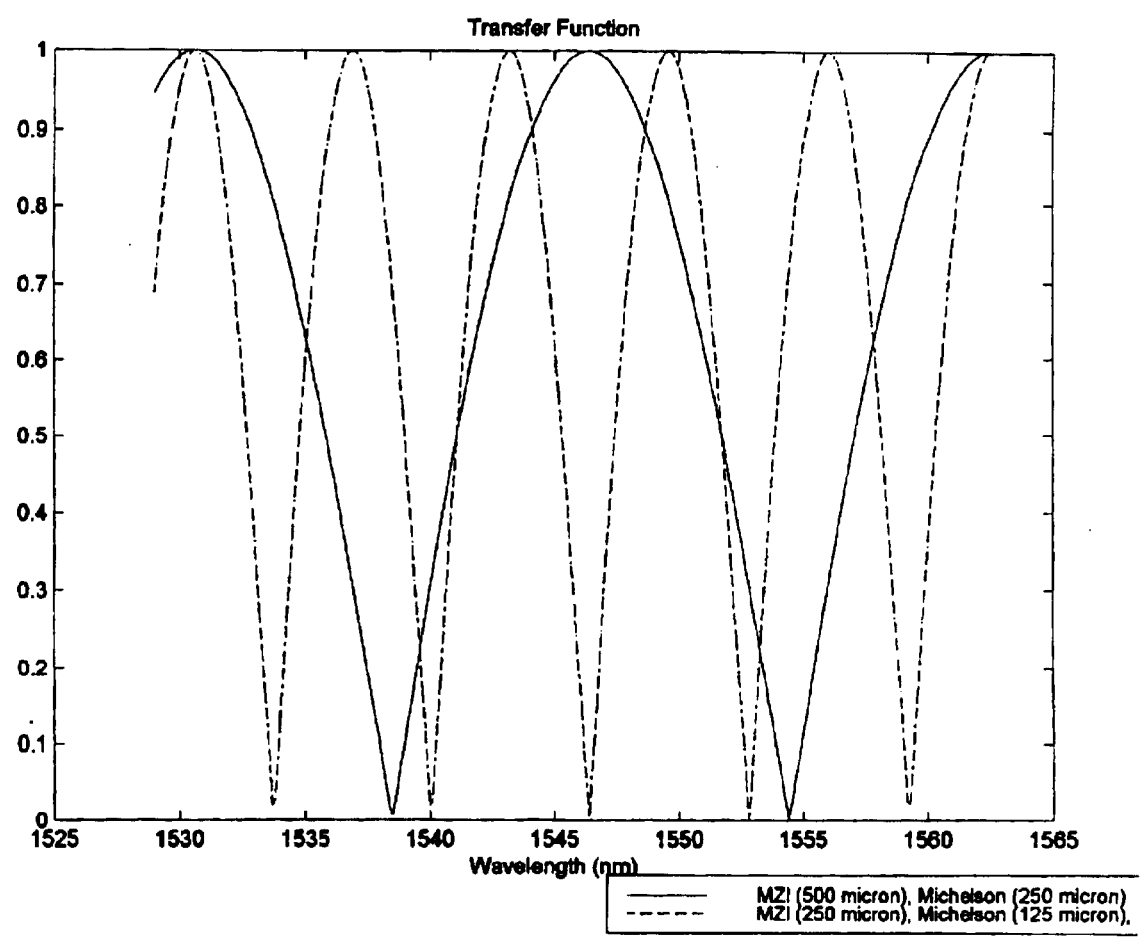
FIG. 2 shows typical wavelength characteristic transfer functions of the MZI shown in FIG. 1 with two physical arms length difference as parameters.

In FIG. 2 are shown the wavelength responses of the asymmetric Mach-Zehnder Interferometer of FIG. 1 the component Michelson Interferometers as a function of the physical length differences of their arms. The wavelength response function of the interferometer, $F(\lambda)$ may be written as:

$$F(\lambda) = \frac{1}{2}\left(1 + \exp\left(j\frac{2\pi\bar{n}\Delta L_{Optical}}{\lambda}\right)\right). \quad (1)$$

where $\bar{n}$ is the average refractive index of the media that light is propagating, $\lambda$ is the wavelength of light, and $\Delta L_{Optical}$ is the free space optical length differences, the total traveling distance difference between the two propagating parts of the input optical signal as if they were traveling in the air. Note, that for the same physical length difference the period of wavelength response oscillation is twice as that of for MZI. This is because in the Michelson interferometer the optical length difference is twice of the physical length difference but it is the same as physical length difference for the MZI. By measuring the wavelength response period, $\Delta\lambda$, we can compute the physical length differences, $\Delta L$, through:

$$2\Delta L_{MIChelson} = \Delta L_{Mach-Zehnder} \cong \frac{\lambda^2}{2\bar{n}\Delta\lambda} \quad (2)$$

Figure 3:
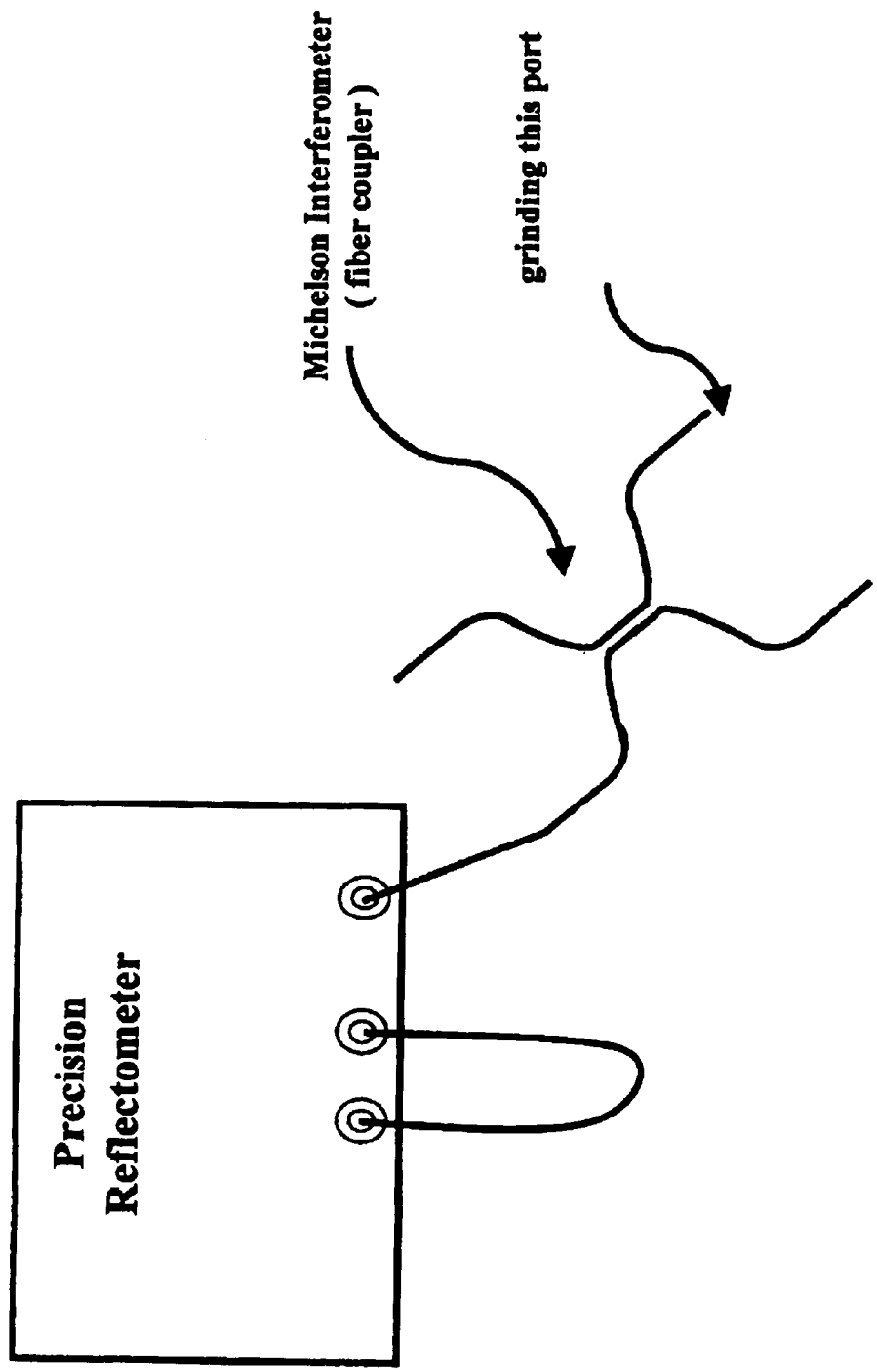
FIG. 3 illustrate, one method according to the present method as applied to adjust an MI.
Figure 4:
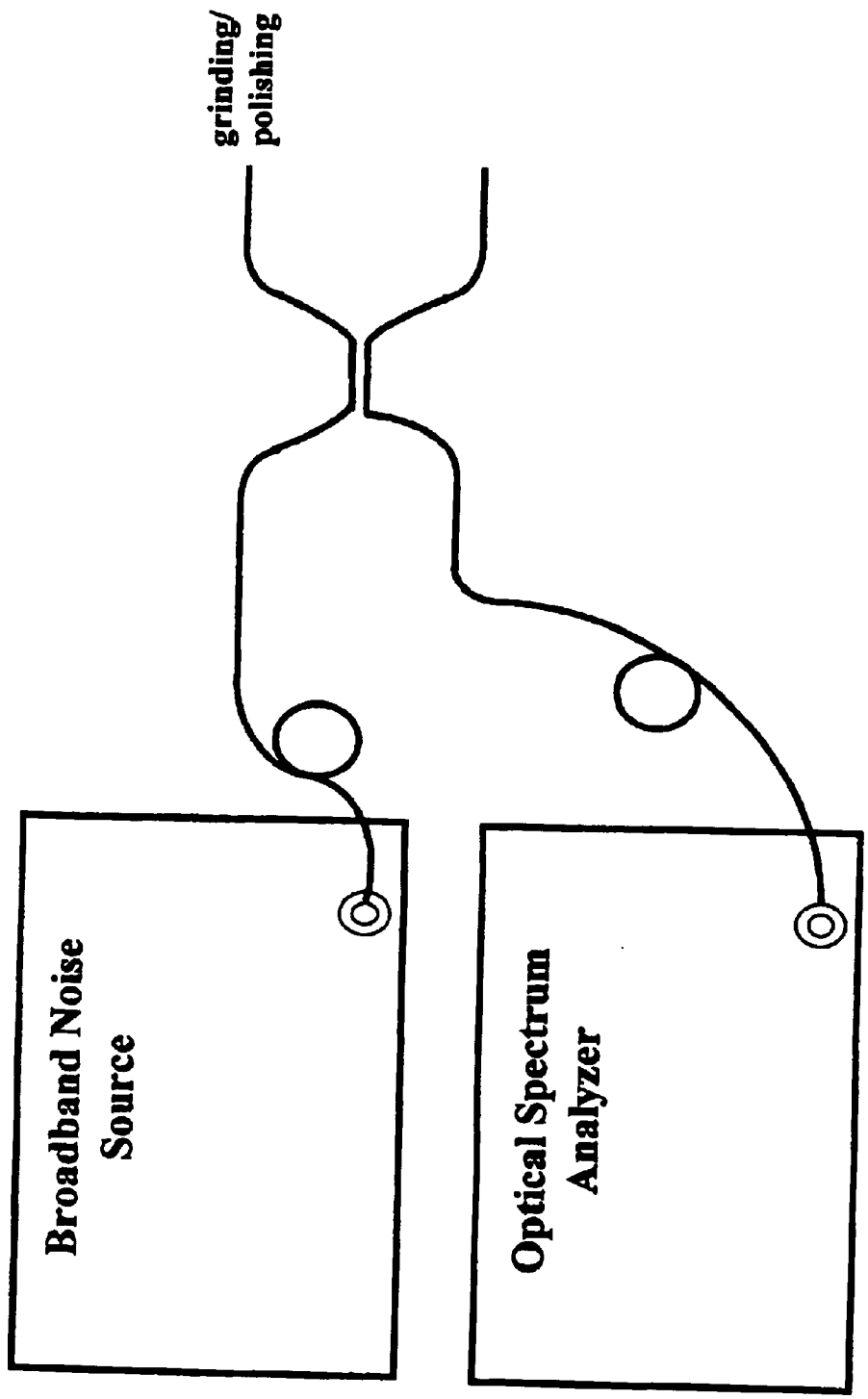
FIG. 4 illustrate, an alternative according to the present invention as applied to adjust an MI.

To construct a MZI with a desired length difference, the length of the MI may be adjusted first then two are fused or mechanically splice together to form a MZI. In case of optical fiber couplers the length adjustment is done by grinding one of the fibers while monitoring the length difference with high precision optical reflectometer as shown in FIG. 3. In the alternative the interference pattern through an optical frequency or wavelength measurement system is monitored as shown in FIG. 4. A high precision optical reflectometer, for instance, is produced by Hewlet Packard as model No. 8504B. Alternatively, a broadband optical signal is input into the Michelson interferometer and one arm is grind and/or polished while observing the wavelength response of the interferometer by an optical spectrum analyzer such as HP model No. 70952B. The grinding is terminated once the desired wavelength response is obtained on the optical spectrum analyzer.

After finishing the length adjustment the splicing of the two optical fiber couplers is carried out by fusion or by mechanical splicing. Several kinds of MZIs with different lengths may be cascaded to provide an optical multiplexer/demultiplexer. Final adjustment of the length and optical phase correction may be done by exposing a section of one arm of the MZI to an ultraviolet light in order to alter the refractive index of the section and consequently further fine tune the optical length difference until the satisfactory wavelength response from the MZI is achieved.

This type of MZI is simple to fabricate compared to the conventional optical multiplexer/demultiplexer using interference filters, planar waveguides or fiber Bragg grating methods.

What is claimed is:

1. A method for making an all fiber optical asymmetrical Mach-Zehnder Interferometer (MZI), having two arms of unequal length comprising the step of interconnecting, back-to-back, two Michelson Interferometers (MI) to provide said two arms of unequal length of the MZI.

2. The method as defined in claim 1, wherein prior to the step of interconnecting at least one of the interconnected MI arms is adjusted in length to be shorter than the other of the interconnected MI arms by a predetermined amount.

3. The method as defined in claim 2, wherein adjusting the length of the MI arm is accomplished by grinding or polishing, or both grinding and polishing, the end of the arm.

4. The method as defined in claim 3, wherein during the step of grinding or polishing the wavelength response (transfer function) of said MI is monitored until a predetermined response is reached.

5. The method as defined in claim 3, wherein during the step of grinding or polishing the length difference is monitored by means of an optical reflectometer until said predetermined amount is reached.

* * * * *